United States Patent
Thatcher et al.

(10) Patent No.: US 11,832,560 B1
(45) Date of Patent: Dec. 5, 2023

(54) SYSTEM AND METHOD FOR DETECTING AND ALIGNING THE ORIENTATION OF AN IRRIGATION SYSTEM WITHIN A DISPLAY

(71) Applicant: Valmont Industries, Inc., Omaha, NE (US)

(72) Inventors: Tracy A. Thatcher, Gretna, NE (US); Mark Moeller, Valley, NE (US)

(73) Assignee: Valmont Industries, Inc.

( * ) Notice: Subject to any disclaimer, the term of this patent is extended or adjusted under 35 U.S.C. 154(b) by 713 days.

(21) Appl. No.: 16/924,788

(22) Filed: Jul. 9, 2020

Related U.S. Application Data

(60) Provisional application No. 62/884,220, filed on Aug. 8, 2019.

(51) Int. Cl.
| | | |
|---|---|---|
| G06F 3/14 | (2006.01) |
| A01G 25/16 | (2006.01) |
| G05D 1/02 | (2020.01) |
| A01G 25/09 | (2006.01) |
| G06F 3/03 | (2006.01) |
| G01C 17/28 | (2006.01) |

(52) U.S. Cl.
CPC ........... *A01G 25/16* (2013.01); *A01G 25/092* (2013.01); *G05D 1/0231* (2013.01); *G06F 3/03* (2013.01); *G06F 3/14* (2013.01); *G01C 17/28* (2013.01); *G05D 2201/0201* (2013.01)

(58) Field of Classification Search
CPC .... A01G 25/16; A01G 25/092; G05D 1/0231; G05D 2201/0201; G06F 3/03; G06F 3/14; G01C 17/28
See application file for complete search history.

(56) References Cited

U.S. PATENT DOCUMENTS

| | | |
|---|---|---|
| 6,441,828 B1 | 8/2002 | Oba et al. |
| 8,471,869 B1 | 6/2013 | Tseng |
| 8,581,935 B2 | 11/2013 | Handa |
| 8,688,966 B2 | 4/2014 | Curtis et al. |
| 8,878,875 B2 | 11/2014 | Park et al. |
| 8,896,533 B2 | 11/2014 | Sonoda et al. |
| 9,106,835 B2 | 8/2015 | Kanma et al. |
| 10,123,492 B2 * | 11/2018 | Whalley .............. A01G 25/165 |
| 10,299,445 B2 * | 5/2019 | Whalley ................... B05B 1/20 |

(Continued)

FOREIGN PATENT DOCUMENTS

WO     2016026074 A1    2/2016

*Primary Examiner* — Vijay Shankar
(74) *Attorney, Agent, or Firm* — Milligan PC LLO

(57) ABSTRACT

The present invention provides a system and method for detecting and aligning the orientation of a displayed irrigation system. According to first preferred embodiment, the method preferably may include the steps of: initializing a controller; polling sensors and initiating the detection of a center pivot location; detecting the position of an outer drive tower; calculating the relative orientation between the center pivot and the outer drive tower; detecting and recording the position of magnetic north; calculating image display data for the irrigation span; transmitting image display data to a display device; displaying the irrigation span at a user selected azimuth and displaying other displayed items at an angle offset from the user selected azimuth; monitoring changes to orientation; recalculating image display data if any orientation change is detected; and retransmitting the image display data.

13 Claims, 5 Drawing Sheets

(56) References Cited

U.S. PATENT DOCUMENTS

| | | | |
|---|---|---|---|
| 10,477,784 B1* | 11/2019 | Williams | A01G 25/092 |
| 10,687,484 B1* | 6/2020 | Williams | A01G 25/092 |
| 2011/0298829 A1 | 12/2011 | Stafford et al. | |
| 2012/0176413 A1 | 7/2012 | Kulik et al. | |
| 2012/0188243 A1 | 7/2012 | Fujii et al. | |
| 2013/0127912 A1 | 5/2013 | Lin | |
| 2013/0328936 A1 | 12/2013 | Huang | |
| 2014/0225930 A1 | 8/2014 | Durmek | |
| 2014/0320537 A1 | 10/2014 | Zhang et al. | |
| 2015/0160841 A1 | 6/2015 | Chang | |
| 2015/0254624 A1 | 9/2015 | Matsumoto | |
| 2016/0133420 A1 | 5/2016 | Rivers | |
| 2016/0217323 A1 | 7/2016 | Takeuchi | |
| 2020/0080105 A1* | 3/2020 | Wintermantel | C12N 15/8286 |
| 2022/0195435 A1* | 6/2022 | Hunter | A01N 63/60 |

\* cited by examiner

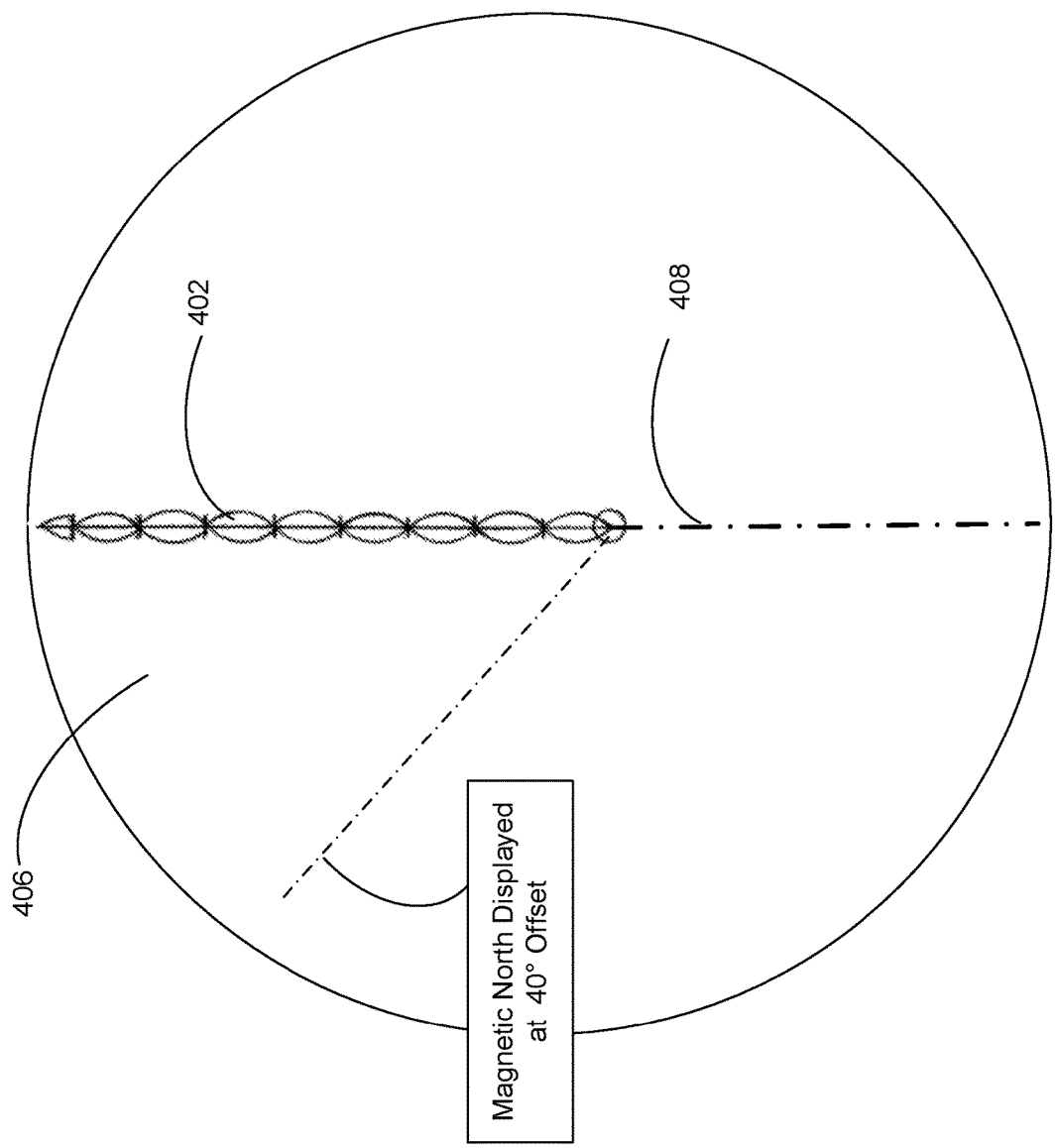

SYSTEM AND METHOD FOR DETECTING AND ALIGNING THE ORIENTATION OF AN IRRIGATION SYSTEM WITHIN A DISPLAY

RELATED APPLICATIONS

The present application claims priority to U.S. Provisional Application No. 62/884,220 filed Aug. 8, 2019.

FIELD AND BACKGROUND OF THE PRESENT INVENTION

Field of the Present Invention

The present invention relates generally to a system and method for managing an irrigation system and, more particularly, to a system and method for detecting and aligning the orientation of an irrigation system within a display.

Background of the Invention

Modern center pivot and linear irrigation systems generally include interconnected spans (e.g., irrigation spans) supported by one or more tower structures to support the conduits (e.g., water pipe sections). In turn, the conduits are further attached to sprinkler/nozzle systems which spray water (or other applicants) in a desired pattern. In these modern irrigation systems, a significant number of powered elements are used to control various aspects of irrigation. This requires providing power and control signals to a variety of sensors, sprayers, drive control systems, motors, transducers as well as to a variety of other systems.

Because of their complexity and increasingly autonomous operation, modern irrigation systems require significant levels of monitoring. Primarily, the control and monitoring of irrigation machines is conducted with cameras creating visual images which are remotely displayed on a variety of devices including a local display screen of the machine controller.

When visual images of an irrigation system are displayed, the display formats of the prior art are typically oriented/aligned with the top of the image displayed at the top of the viewer. Alternatively, the images are displayed in alignment with true north at the top of the display. For example, WIPO Application No. WO2016026074A1 teaches a computer-implemented method for determining compass orientation of imagery, involves identifying a position of a feature in imagery based on the visual similarity of the feature to a celestial object. This application teaches orientation of imagery relative to a compass bearing may be determined based on the position of the sun or other information relating to celestial bodies captured in the image. Alternatively, U.S. Patent No. U.S. Pat. No. 9,106,835B2 teaches an imaging device which includes an azimuth converter which computes the rotation angle and roll direction of an imaging device based on acceleration information. U.S. Pat. No. 8,896,533B2 teaches an electronic device including a display with an image display area which is configured to change orientation based on a change of position of the device. Further, U.S. Patent Publication No. US20140320537A1 teaches a method in which a display of an electronic map is oriented according to a detected posture of an electronic apparatus. Similarly, U.S. Patent No. U.S. Pat. No. 6,441,828B1 teaches an image display device for use with a digital still camera which controls the display of an image using information recorded in a memory card.

Each of the prior art display techniques have their specific uses. However, there is no display technique which allows for an irrigation operator to consistently view an irrigation machine from the orientation of the irrigation machine itself.

SUMMARY OF THE PRESENT INVENTION

To address the shortcomings presented in the prior art, the present invention provides a system and method for detecting and aligning the orientation of an irrigation system within a display. According to first preferred embodiment, the method preferably may include the steps of: initializing a controller; polling sensors and initiating the detection of a center pivot location; detecting the position of an outer drive tower; calculating the relative orientation between the center pivot and the outer drive tower; detecting and recording the position of magnetic north; calculating image display data for the irrigation span; transmitting image display data to a display device; displaying the irrigation span at a user selected azimuth and displaying other displayed items at an angle offset from the user selected azimuth; monitoring changes to orientation; recalculating image display data if any orientation change is detected; and retransmitting the image display data.

The accompanying drawings, which are incorporated in and constitute part of the specification, illustrate various embodiments of the present invention and together with the description, serve to explain the principles of the present invention.

BRIEF DESCRIPTION OF THE DRAWINGS

FIG. 5 shows an exemplary display of the system shown in FIG. 4 in accordance with a further preferred embodiment of the present invention.

DESCRIPTION OF THE PREFERRED EMBODIMENTS

Figure 1:
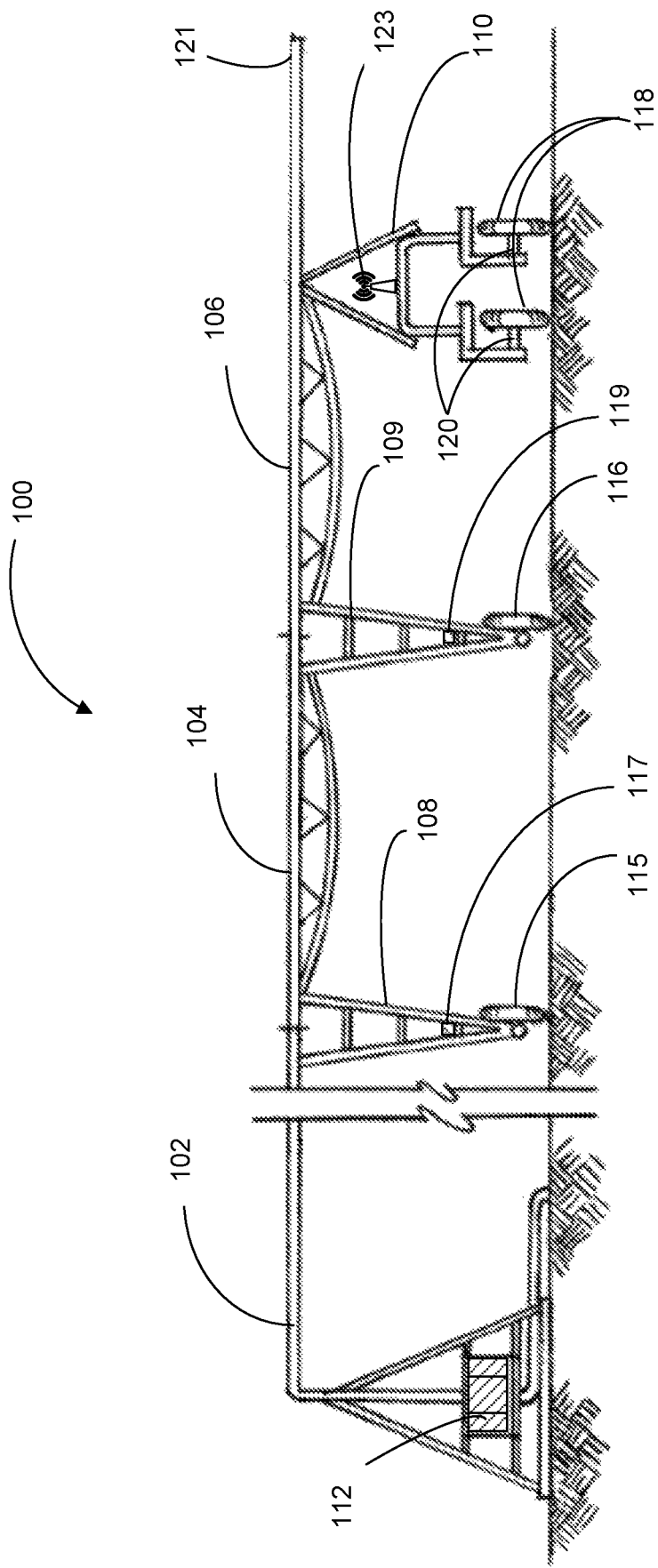
FIG. 1 shows an exemplary irrigation system for use with the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

In accordance with preferred embodiments of the present invention, it should be understood that the term "drive unit" may preferably include a number of sub-components including: a motor, a controller, a communication device (such as a PLC or the like) and an alignment device. Further, while the invention is discussed below with respect to three exemplary towers, the number of towers used may be expanded or reduced (i.e. 2-100 towers) as needed without departing from the spirit of the present invention. Further, the term "motor" as used herein may refer to any suitable motor for providing torque to a drive wheel. Accordingly, the term "motor" as used herein may preferably include motors such switch reluctance motors, induction motors and the like.

The terms "program," "computer program," "software application," "module," firmware" and the like as used herein, are defined as a sequence of instructions designed for execution on a computer system. The term "solid state" should be understood to refer to a range of solid state electronic devices which preferably include circuits or devices built from solid materials and in which the electrons, or other charge carriers, are confined entirely within the solid material. Exemplary solid-state components/materials may include crystalline, polycrystalline and amorphous solids, electrical conductors and semiconductors. Common solid-state devices may include transistors, microprocessor chips, and RAM.

A program, computer program, module or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such a RAM, buffers, cache memory, and network circuits are contemplated to serve as such data storage means according to different embodiments of the present invention.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods includes: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neutral network) logic, quantum devices, and hybrids of any of the above device types. Of course, the underlying device technologies may be provided in a variety of component types, e.g., metal-oxide semiconductor field-effect transistor (MOS-FET) technologies like complementary metal-oxide semiconductor (CMOS), bipolar technologies like emitter—coupled logic (ECL), polymer technologies (e.g., silicon-conjugated polymer and metal-conjugated polymer-metal structure), bidirectional triode thyristors (TRIAC), mixed analog and digital, and the like.

It should be understood by those skilled in the art that the present invention may preferably include a processor and one or more peripherals coupled via a peripheral interface or the like. Example peripheral interfaces may be implemented based on the following standards: Universal Asynchronous Receiver/Transmitter (UART), General Purpose Input Output (GPIO), Serial Peripheral Interface (SPI), Inter-Integrated Circuit (I2C) and the like. In some examples, the peripheral interfaces may include other components and controllers. For example, a display controller may preferably be used for connecting a display panel. Similarly, a storage controller may be used for connecting storage devices. In addition, these controllers may also be separated from the peripheral interface and integrated inside the processor or the corresponding peripheral.

Further, the preferred system of the present invention may preferably further include a memory to store software programs and modules, such as the program instructions/modules corresponding to the method and device of controlling an electronic map in the various embodiments of the present disclosure. The processor may preferably perform a variety of functions and data processing by running software programs and modules stored in the memory to implement various embodiments of the present disclosure. Memory may include high-speed random-access memory and non-volatile memory, such as one or more magnetic storage devices, flash memory, or other non-volatile solid-state memory. In some examples, the memory may further include a remote memory or database, which may be connected to elements of the present invention via a network or the like. The network instances include but not limited to, the Internet, intranets, local area network, mobile communication network, and their combinations.

The present invention may preferably further include an RF module for receiving and transmitting electromagnetic waves, implementing the conversion between electromagnetic waves and electronic signals, and communicating with communication networks or other devices. The RF module may include a variety of existing circuit elements, which perform functions, such as: antennas, RF transceivers, digital signal processors, encryption/decryption chips, memory, etc. Further, the RF module may preferably communicate with a variety of networks such as the Internet, intranets, wireless network and communicate to other devices via wireless network. The above wireless network may include a cellular telephone network, wireless local area network (LAN) or metropolitan area network (MAN). The above wireless network can use a variety of communications standards, protocols and technologies, including but not limited to Global System for Mobile Communication (GSM), Enhanced Data GSM Environment (EDGE), wide-band code division multiple access (W-CDMA), Code division access (CDMA), time division multiple access (TDMA), Wireless, Fidelity (Wi-Fi) (such as the American Institute of Electrical and Electronics Engineers Association standards IEEE 802.11a, IEEE 802.11b, IEEE802.11g, and/or IEEE 802.11n), Voice over internet protocol (VoIP), Worldwide Interoperability for Microwave Access (Wi-Max), other protocols used for mail, instant messaging and short message, as well as any other suitable communication protocol, even including the protocols which are not yet been developed currently.

FIGS. 1-4 illustrate various configurations of irrigation systems which may be used with example implementations of the present invention. As should be understood, the irrigation systems shown in FIGS. 1-4 are exemplary systems onto which the features of the present invention may be integrated. Accordingly, FIGS. 1-4 are intended to be purely illustrative and any of a variety of systems (i.e. fixed systems as well as linear and center pivot self-propelled irrigation systems, stationary systems, corner systems and the like) may be used with the present invention without limitation. For example, although FIG. 1 is shown as a center pivot irrigation system, the exemplary irrigation system 100 of the present invention may also be implemented as a linear irrigation system. The example irrigation system 100 is not intended to limit or define the scope of the present invention in any way. According to further preferred embodiments, the present invention may be used with a variety of motor types such as gas powered, DC powered, switch reluctance, single phase AC and the like.

With reference now to FIG. 1, spans 102, 104, 106 are shown supported by drive towers 108, 109, 110. Further, each drive tower 108, 109, 110 is shown with respective motors 117, 119, 120 which provide torque to the drive wheels 115, 116, 118. As further shown in FIG. 1, the irrigation machine 100 may preferably further include an extension/overhang 121 which may include an end gun (not shown). As further shown, a position sensor 123 may be provided to provide positional and angular orientation data for the system of the present invention as discussed further below. It should be further understood that FIG. 1 provides an illustration of an irrigation machine 100 without many added powered elements and sensors. However, any of a variety of different powered systems may be added without limitation. These systems may be connected and controlled via a central control/pivot panel 112.

Figure 2:
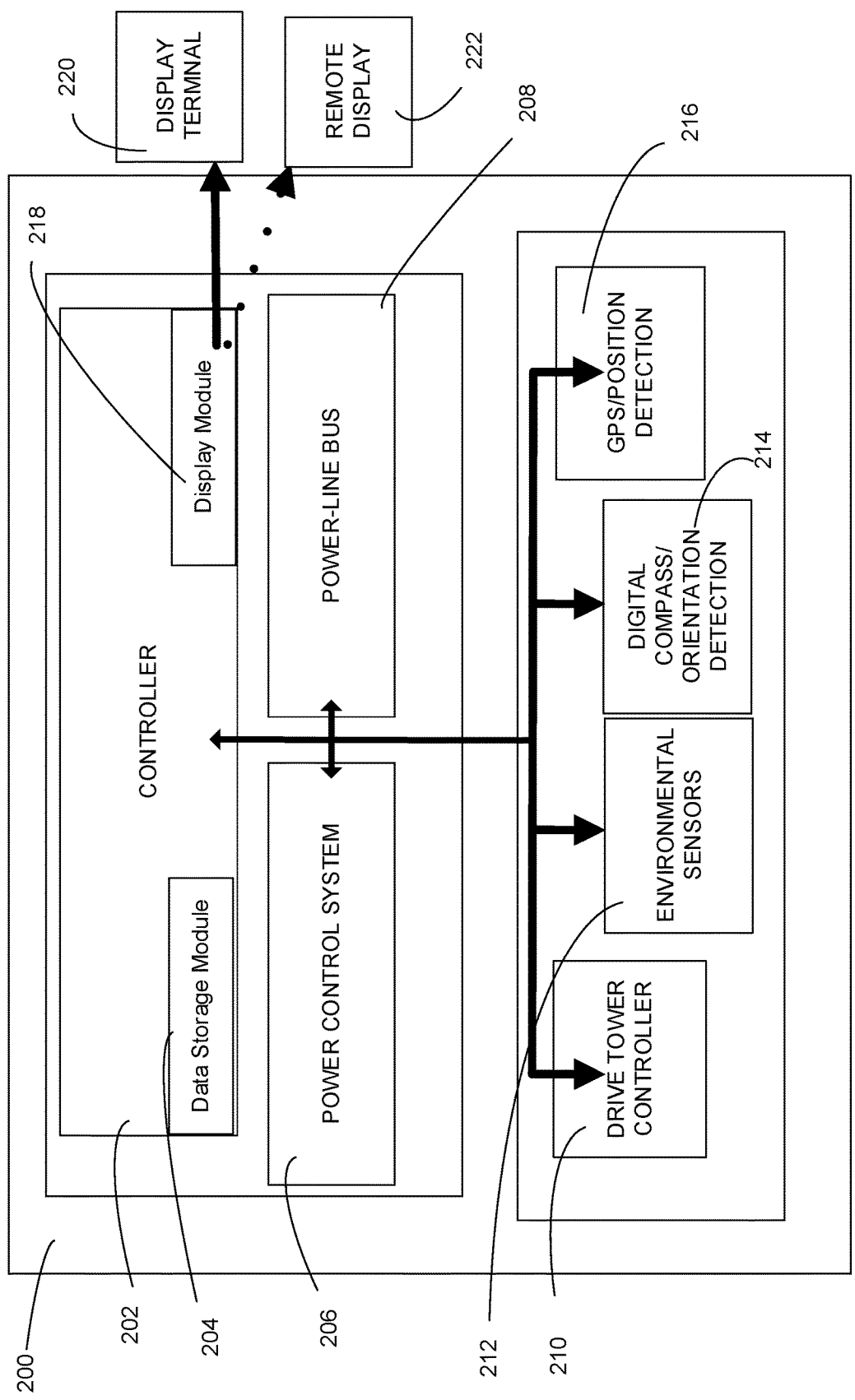
FIG. 2 shows a block diagram illustrating the exemplary processing architecture of a control device in accordance with a first preferred embodiment of the present invention.

With reference now to FIG. 2, an exemplary controller/control device 200 which represents functionality to control one or more operational aspects of the irrigation system 100 shall now be discussed. As shown in FIG. 2, an exemplary control device 200 of the present invention may preferably include a controller/processor 202 having a memory/data storage module 204. The controller 202 preferably provides processing functionality for the control device 200 and may include any number of processors, micro-controllers, or other processing systems. The controller 202 may execute one or more software programs that implement techniques described herein. Preferably, the data storage module 204 may include tangible computer-readable media that provides storage functionality to store various data associated with the operation of the control device 200, such as the software program and code segments mentioned above, or other data to instruct the controller 202 and other elements of the control device 200 to perform the steps described herein. The data storage module 204 may include, for example, removable and non-removable memory elements such as RAM, ROM, Flash (e.g., SD Card, mini-SD card, micro-SD Card), magnetic, optical, USB memory devices, and so forth.

As further shown, the controller 202 may preferably further include display module 218 which receives control and image data, and which provide image data for display on an image terminal 220. Alternatively, the functions of the display module 218 may include constructing and transmitting image data for display on a remote display 222 (i.e. a tablet, smart phone, remote terminal) or the like.

As further shown, the exemplary control device 200 may further include a power control system 206 and a power-line BUS 208 which may include conductive transmission lines, circuits and the like for controlling and routing electric power, controlling its quality, and controlling the devices attached to a power-line carrier system as discussed further below. As further shown, the exemplary attached devices may include many further, optional control and data systems such as: driver tower controllers 210, environmental sensors 212, digital compass/orientation detectors 214, and location sensors 216 (i.e. GPS, LORAN, GLONASS, Galileo, BeiDou) and any of a variety of other powered devices.

Figure 3:
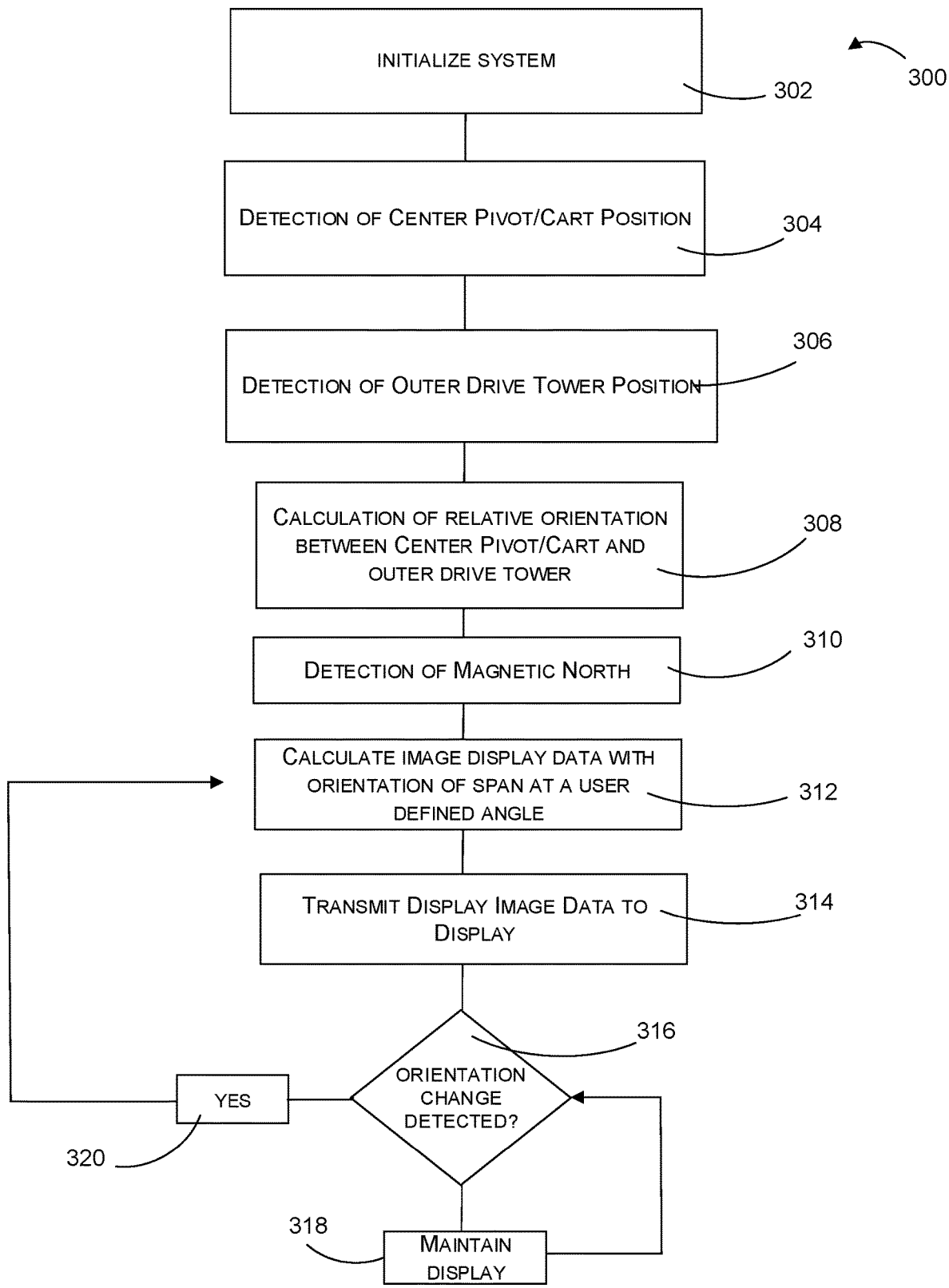
FIG. 3 shows a flow chart illustrating an exemplary control method in accordance with a further preferred embodiment of the present invention.
Figure 4:
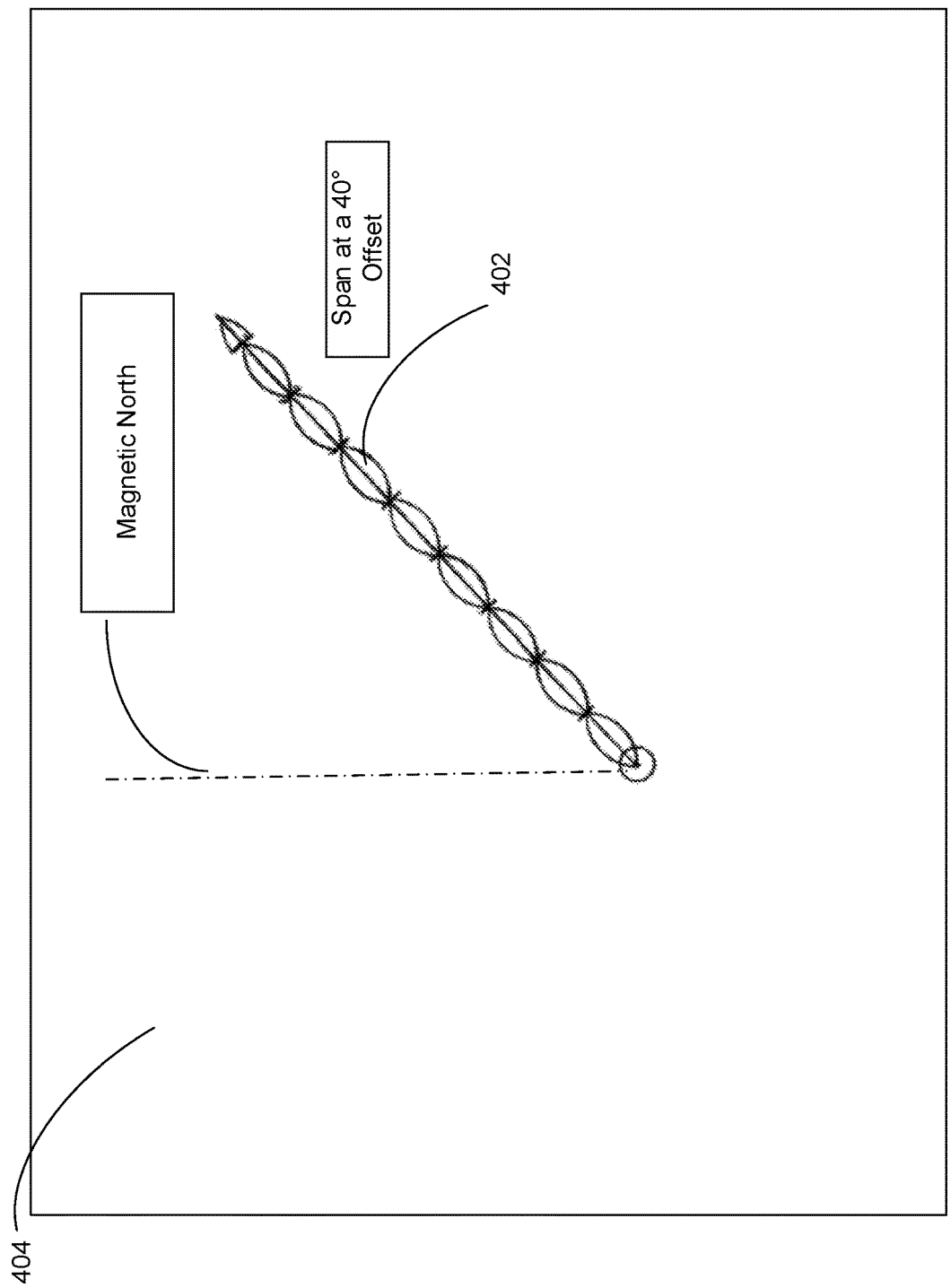
FIG. 4 shows a block diagram of an exemplary irrigation span within a field to be irrigated.

With further reference now to FIGS. 3-5, a preferred method 300 in accordance with further preferred embodiments of the present invention shall now be discussed. As shown in FIG. 3, at a preferred first step 302, the system may preferably be turned on and initialized. Thereafter, at a next step 304, the controller may poll sensors and initiate the detection of the center pivot (or cart) location. According to a preferred embodiment, the detected position may be detected via GPS or via any other location sensor 216. Still further, the location of the center pivot (or cart) may be predetermined and stored within the memory. Accordingly, step 304 may include the step of retrieving the location from memory. At a next step 306, the system may pole sensors and initiate detection of the position of an outer drive tower. At a next step 308, the system may preferably then calculate the relative orientation between the center pivot/cart and the outer drive tower. In this way, the system at step 308 may preferably calculate the azimuth/orientation of the irrigation span. According to an alternative preferred embodiment, the system of the present invention may determine the azimuth/orientation of the irrigation span using a digital compass which is interfaced with the controller.

At a next step 310, the system of the present invention may preferably further detect and record the position of magnetic north. At a next step 312, the controller may preferably next calculate image display data for the irrigation span. According to a preferred embodiment, the image display data preferably further includes data indicating the orientation of the irrigation span. According to a further preferred embodiment, the data indicating the orientation of the irrigation span may preferably correspond with a default azimuth (i.e. 0 degrees) or may allow for any other user defined angle. According to a further preferred embodiment, the data may preferably further include adjusted/offset display azimuths for each image feature relative to the orientation of the irrigation span. At a next step 314, the controller preferably may then transmit the image display data to a display device. According to a preferred embodiment, the display device may be connected directly to the control panel of the irrigation machine. According to an alternative preferred embodiment, the display device may be a remote display device (i.e. tablet, smart phone, or remote computer). In such a case, the system may imbed the image display data within an RF signal for display by a remote display device. At a next step 316, the system of the present invention may preferably then monitor and detected any orientation changes. At a next step 318, if no change in orientation is detected, the system may preferably maintain the display. At a next step 320, if any orientation change is detected, the system may preferably recalculate the updated image display data 312 and proceed to retransmit image display data 314.

With reference now to FIG. 4, a block diagram illustrating an exemplary irrigation span 402 having a given orientation (i.e. 40 degrees) within a given field 404 is shown. Thereafter, applying aspects of the present invention and applying steps 302-320 discussed above, the displayed orientation of the irrigation span 402 may be adjusted in accordance with a default setting or a user's preference to allow for a more clear and consistent display of the irrigation span 402. For example, as shown in FIG. 5, the irrigation span 402 may be shown in an image display 406 with the detected orientation 408 of the irrigation span 402 displayed at a default/user selected display azimuth (i.e. shown as 0 degrees) and with all other display azimuths adjusted accordingly. According to a further preferred embodiment, magnetic north may preferably be further displayed so that it is offset relative to the displayed display azimuth of the irrigation span 402.

While the above descriptions regarding the present invention contain much specificity, these should not be construed as limitations on the scope, but rather as examples. Many other variations are possible. For example, the processing elements of the present invention by the present invention may operate on a number of different frequencies, voltages, amps and BUS configurations. Further, the communications provided with the present invention may be designed to be one in nature. Further, the systems of the present invention may be used with any arrangement of drive towers including both linear and center pivot systems. Further, as needs require, the processes for transmitting data within the present invention may be designed to be push or pull in nature. Still, further, each feature of the present invention may be made to be remotely activated and accessed from distant monitoring stations. Accordingly, data may preferably be uploaded to and downloaded from the present invention as needed.

Accordingly, the scope of the present invention should be determined not by the embodiments illustrated, but by the appended claims and their legal equivalents.

What is claimed is:

1. A method for detecting and aligning the orientation of a displayed irrigation system, wherein the method comprises:
    initializing a controller of an irrigation system;
    polling sensors and initiating the detection of a center pivot location;
    detecting the position of an outer drive tower;
    calculating the relative orientation between the center pivot and the outer drive tower; wherein the irrigation system calculates the orientation of an irrigation span using a digital compass;
    detecting and recording the position of magnetic north;
    calculating image display data for the irrigation span, wherein the image display data comprises data indicating the orientation of the irrigation span;
    transmitting the image display data to a display device;
    displaying the irrigation span at a user selected azimuth and displaying other displayed items at an angle offset from the user selected azimuth; wherein the angle offset is determined based at least in part on the image display data;
    monitoring changes in the orientation of the irrigation system;
    recalculating image display data when an orientation change is detected; and
    retransmitting updated image display data.

2. The method of claim 1, wherein the location of the center pivot is retrieved from a stored memory.

3. The method of claim 2, wherein the irrigation system determines the orientation of the irrigation span using a digital compass which is interfaced with the controller.

4. The method of claim 3, wherein the image display data indicating the orientation of the irrigation span is created at least in part based on a default azimuth.

5. The method of claim 4, wherein the default azimuth is 0 degrees.

6. The method of claim 3, wherein the image display data indicating the orientation of the irrigation span corresponds with a user defined angle between 0 and 180 degrees.

7. The method of claim 6, wherein the display device is connected directly to the control panel of the irrigation system.

8. The method of claim 7, wherein the display device comprises a remote display device.

9. The method of claim 8, wherein the image display data is embedded within an RF signal for display by the remote display device.

10. The method of claim 9, wherein the displayed orientation of the irrigation span is adjusted based at least in part on a user inputted variable.

11. The method of claim 10, wherein the display of at least a second set of image data is adjusted relative to the displayed orientation of the irrigation span.

12. The method of claim 11, wherein the display device displays an indication of the direction of magnetic North using a graphical icon.

13. The method of claim 12, wherein the display of the graphical icon indicating the direction of magnetic North is offset relative to the displayed azimuth of the irrigation span.

* * * * *